Figures 1, 2, 3:
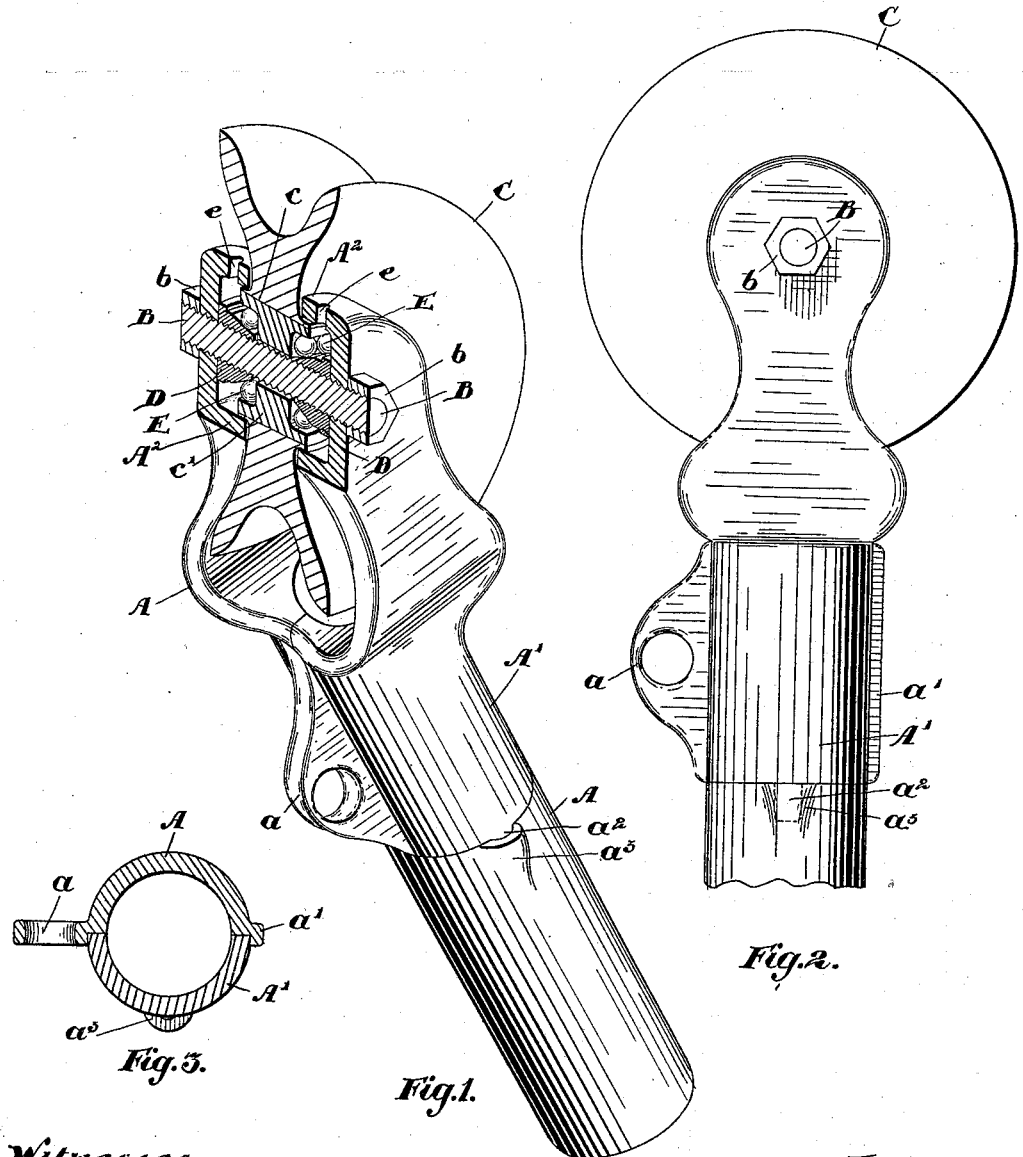

No. 628,539. Patented July 11, 1899.
J. KALTE.
TROLLEY WHEEL.
(Application filed Mar. 11, 1899.)
(No Model.)

Witnesses. Inventor:
John Kalte.
by Featherstonhaugh & Co
Attys.

UNITED STATES PATENT OFFICE.

JOHN KALTE, OF PORT ELGIN, CANADA.

TROLLEY-WHEEL.

SPECIFICATION forming part of Letters Patent No. 628,539, dated July 11, 1899.

Application filed March 11, 1899. Serial No. 708,743. (No model.)

*To all whom it may concern:*

Be it known that I, JOHN KALTE, machinist, of the village of Port Elgin, in the county of Bruce, in the Province of Ontario, Canada, have invented certain new and useful Improvements in Trolley-Wheels, of which the following is a specification.

My invention relates to improvements in trolley-wheels and the bearing-harps therefor; and the object of the invention is to devise such a bearing whereby the heating and wearing of the bearing may be reduced to a minimum, and consequently the life of such bearing and wheel greatly increased; and it consists, essentially, of a trolley-wheel provided in the center with a double tapered cup, which is fitted into a corresponding axial hole, cones being provided at each side in order to hold the balls and complete the bearing, such cones being supported on a threaded axle, which is secured at each side in a harp constructed as hereinafter more particularly explained.

Figure 1 is a sectional perspective view of the upper part of the trolley-pole, showing the harp and trolley-wheel. Fig. 2 is a side elevation. Fig. 3 is a cross-section through the harp.

In the drawings like letters of reference indicate corresponding parts in each figure.

A is the harp, one side, A', of which is removable near the top. A lug $a$ is formed, to which the rope is connected, and a lug $a'$, and between these lugs fit the removable portion A', which is also provided with a teat $a^2$, which fits into a recess $a^3$ in the solid portion of the harp. The upper part of the removable portion of the harp is connected to the other portion by a centrally-threaded spindle B, having a nut $b$ at each end. The upper parts of both the removable and solid portion of the harp are provided with inwardly-extending annular flanges $A^2$.

C is the trolley-wheel, which is provided with a tapered hole $c$, within which fits the double tapered cup $c'$.

D D are the cones, which are screwed onto each side of the threaded spindle B, and E are the balls between the cones D and the cups $c'$.

$e$ are the orifices by which the oil is supplied to the cones, and consequently to the cups.

It will be seen from this description that my invention possesses many advantages over the ordinary trolley-wheel as now constructed. In the first place the trolley-wheel is kept central, so that it cannot sway from side to side, and this is an important desideratum, as such shifting of the trolley-wheel on the axle necessarily causes greater friction and heating of the axle, and thus deleteriously affects its life. The bearings, it will be seen, are readily kept lubricated, and as the double cup for the balls is tapered on the outside, such cup may be driven out when the removable portion of the harp is taken apart and a new one inserted, thus rendering it unnecessary to supply a new trolley-wheel, and, vice versa, if the trolley-wheel becomes worn and useless and the bearing is not rendered so such bearing may be utilized for a new trolley-wheel. The overhanging annular flanges at the top of the harp keep the dust out from the bearings, and consequently in every sense this device is one which runs very easily and with but a minimum amount of friction.

What I claim as my invention is—

1. In a trolley-wheel and bearing, in combination, the divided harp, an axle connecting the parts thereof, a trolley-wheel having a central hub, a double cup fitted therein, cones threaded on said axle, ball-bearings and flanges extending inwardly from the sections and overhanging the hub of said wheel and closely fitting the same, substantially as described.

2. In a trolley-wheel and bearing therefor, the combination with the divided harp having inwardly-projecting flanges at the top, of the threaded axle extending centrally within the flanges and connecting the parts together, the cones secured on the axle, the trolley-wheel having a tapered axial hole, the double cup having a tapered periphery, and the balls all arranged as shown and for the purpose specified.

3. The combination with the trolley-wheel and axial support for same, of the harp comprising the solid portion having the bottom longitudinal lugs or ribs and bottom recess, and the removable portion of the harp having a teat therein fitting into the recess in the bottom, and the sides fitting within the longitudinal lugs or ribs, and the spindle connecting the removable portion of the harp to the solid portion at the top as and for the purpose specified.

4. The combination with the trolley-wheel, of the harp having the solid portion divided diametrically at the bottom and the removable portion fitting thereon and engaging means between the contacting edges of the removable and solid portions for connecting the two parts together at the bottom and the axial support connecting the two parts at the top and forming a bearing for the wheel as and for the purpose specified.

JOHN KALTE.

Witnesses:
   B. BOYD,
   W. ARMS.